(12) United States Patent
Thakur et al.

(10) Patent No.: US 9,171,088 B2
(45) Date of Patent: Oct. 27, 2015

(54) MINING FOR PRODUCT CLASSIFICATION STRUCTURES FOR INTERNET-BASED PRODUCT SEARCHING

(75) Inventors: Shashidhar A. Thakur, Saratoga, CA (US); Neil Fernandes, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 805 days.

(21) Appl. No.: 13/081,033

(22) Filed: Apr. 6, 2011

(65) Prior Publication Data

US 2012/0259882 A1    Oct. 11, 2012

(51) Int. Cl.
G06F 17/30    (2006.01)

(52) U.S. Cl.
CPC ................. *G06F 17/30873* (2013.01)

(58) Field of Classification Search
CPC .............. G06F 17/21; G06F 17/30112; G06F 17/30336
USPC .......................................... 707/708, 696, 738
See application file for complete search history.

(56) References Cited

U.S. PATENT DOCUMENTS

| | | | |
|---|---|---|---|
| 7,818,209 B1 * | 10/2010 | Lu et al. ...................... | 705/14.54 |
| 2006/0059135 A1 * | 3/2006 | Palmon et al. ..................... | 707/3 |
| 2007/0208679 A1 * | 9/2007 | Tseng et al. ..................... | 706/45 |
| 2012/0246026 A1 * | 9/2012 | Xu et al. ..................... | 705/26.63 |

OTHER PUBLICATIONS

"Supervised Machine Learning: A Review of Classification Techniques" S.B. Kotsiantis (Jul. 16, 2007).*
Automatic Discovery of Useful Facet Terms Wisam Dakka, Rishabh Dayal, & Panagiotis G. Ipeirotis (2006).*
Title: Internet Article: eBay: Turbo Lister FAQ—Seller Tools retrieved from http://pages.ebay.com/turbolister, Publ: http://pages.ebay.com/turbolister2/faq.html, pp.1-4, Date: Nov. 30, 2010.
Title: Internet Article: eBay: Turbo Lister—Seller Tools—List Multiple Items and Upload to eBay in Bulk!, Publ: http://pages.ebay.com/turbo lister, pp. 1-2, Date: Nov. 30, 2010.
Title: EBay—Turbo Lister Listing Activity Quick Start Guide, Publ: eBay File Exchange Catalog Listing Template Instructions, Ver. 1.1, pp. 1-8, Date: Apr. 1, 2007.
Author: Liu et al., Title: Clustering Billions of Images with Large Scale Nearest Neighbor Search, Publ: IEEE Workshop on Applications of Computer Vision (WACV '07), pp. 1-6, Date: Jan. 1, 2007.
Author: Sommermeyer, K., Title: International Search Report and Written Opinion issued in International Application PCT/US2012/032580, pp. 1-9, Date: Sep. 5, 2012.

* cited by examiner

*Primary Examiner* — Hosain Alam
*Assistant Examiner* — Bruce Witzenburg
(74) *Attorney, Agent, or Firm* — Johnson, Marcou & Isaacs, LLC

(57) ABSTRACT

A product search engine uses web-crawling software to index textual webpage content from multiple internet sources. The product data obtained from the web-crawling process is then granulized by parsing methods into key words, such as, words and/or phrases. These components are compared with existing key words from search queries or webpage content. Each key word includes component tags, where the component tags map each component to product classification information in the form of structural parameters; and other product information such as, URLs, product images and product descriptions. When at least one matching key word is found, structural parameters are extracted from the matching components and assigned to the received key words. A search results webpage including product information grouped by associated structural parameter may be provided.

28 Claims, 4 Drawing Sheets

400

405 → [ hiking boots ] [ Search ]

About 2,960,000 results (0.27 seconds)

410 → Name Brand Hiking Boots
HikingBoots.com Hiking Boots @ HikingBoots.com Free Shipping on all Hiking Boots!

413 → Most Popular

1  ABC Brand Steel-Toed Hiking Boot
$40 from 38 stores – 23 nearby stores – limited stock
***** 78 reviews
Add to Shopping List ←— 417

2  XYZ Brand Lightweight Hiking Boot
$45 from 23 stores – 12 nearby stores
***** 124 reviews
Add to Shopping List 415 → Related searches for hiking boots:
Brands: Vasque – Columbia – Asolo – North Face – Merrell ←— 420
Stores: Altrec – REI – Zappos – Cabelas – Timberland
Types: Lightweight – Wading – Steel Toe
Products: Asolo Echo – Merrell Outbound – Timberland Eurohiker

Fig. 4

MINING FOR PRODUCT CLASSIFICATION STRUCTURES FOR INTERNET-BASED PRODUCT SEARCHING

TECHNICAL FIELD

The present disclosure relates generally to e-commerce and, more specifically, to systems, methods, and computer programs of mining for structures in product queries for use in internet-based product searches.

BACKGROUND

An internet-based product searching service (or "search engine") allows users to search for products and services offered for sale by manufacturers and retailers. The search service can be deployed as an independent search service website capable of aggregating product information from multiple online merchants, or an internal search engine section for a retailer's website. For simplicity, online or physical store merchants, such as, "retailers," "manufacturers," "resellers," "service providers," and "auction sites" will be used as inter-changeable terms in this disclosure, and are herein referred to as "merchants." "Products" and "services" are also used inter-changeably for purposes of simplicity in this disclosure, and are herein referred to as "products."

An end-user can use a client computer to input a search query for a product via a search engine website or the search engine section of a merchant website. The search query is transmitted to a backend computing device for processing. The backend computing device generates a list of search results responsive to the search query by matching each search query to the product information in a product database. The search results are sent to the client computer, and may include hyperlinked product descriptions, images, and/or other interactive information that is responsive to the search query.

Merchants typically design individual webpages for each of their products, and implement software-coded description tags for each product webpage within the merchant website. A search query for product information from a client computing device is matched to one or more product webpages using the description tags of the webpages on a product database. When matching product webpages are identified, the backend computing device generates a search results webpage that includes a list of matching products from the identified webpages. Generally, for each product in the list, the webpage includes a hyperlinked product name (hyperlinked to a product webpage), a product image, and a brief description of the product. The hyperlinked product name is selectable to direct the end-user to the product webpage for more detailed product description.

The product database, which includes such information as the hyperlink information to product webpages, the product names, and brief descriptions of the products, is generated and updated by a software module on a different or the same backend computing device as described above. This product database is stored on the backend computing device for access during the processing of the received search query. A software module generates product data by initiating a data mining operation to automatically mine for product information from various merchant websites. Software agents of the backend computing device may automatically populate the product database by discovering content from product webpages, or a person may manually populate the product database using a product catalog, for example, a web-crawler software agent for tracking webpage changes in internet websites can be used to populate the product database. Exemplary content indexed by a web-crawler includes webpage uniform resource locators (URLs), meta-tags, images, and textual objects.

Traditional product search engines incorrectly derive product information from the web-crawler data. Several aspects of the product information are generally different for each merchant. As an example, merchants offer different product descriptions and product categories to establish a unique website interface. This varied classification of product data across different merchants results in erroneous or conflicting product information when the product data is aggregated by a search.

SUMMARY

In certain exemplary embodiments, a computer-implemented method for classifying search results responsive to a search query may be provided. The method can include receiving, by a computer, a search query. The computer can identify at least one of a plurality of key words in a product database, which matches at least a portion of the received search query. Each key word can have associated therewith one or more structural parameters, such as a product type, a brand name, a manufacturer, a product attribute, a product retailer, a product line, and a product discount. For example, the computer can obtain the key words from product search feeds for known products, web clicks on search query results, product queries in product logs, website site-maps, product categories on manufacturer websites, and/or product categories in manufacturer brochures.

The computer can determine whether at least one of the key words matches at least a portion of the search query and update the product database based on that determination. For example, the computer can increase a confidence score of an association between each matched key word and the at least a portion of the search query in response to determining that at least one of the key words matches at least a portion of the search query. In addition, the computer can add a new key word, which is based on the at least a portion of the search query, to the product database in response to determining that none of the key words match the search query. In response to determining that at least one of the key words matches at least a portion of the search query, the computer can identify each structural parameter associated in the product database with each matched key word and communicate suggested search terms grouped by at least one identified structural parameter, for display in response to the search query. The suggested search terms can include information associated with the matching key words in the product database, for example.

In certain additional exemplary embodiments, a computer can mine textual content for classification structures for search results. The computer can receive textual content that includes a textual component. The computer can identify a match between at least one of a plurality of existing key words and the received textual component. The existing key word can have associated therewith at least one structural parameter that classifies the existing key word. The computer can determine whether the match is valid. In response to determining that the match is valid, the computer can classify the received textual component with the existing structural parameter associated with the matching key word. The computer can store, in a product database, the textual component with its associated structural parameter.

These and other aspects, objects, features, and advantages of the exemplary embodiments will become apparent to those skilled in the art upon consideration of the following detailed description of illustrated exemplary embodiments, which include the best mode of carrying out the invention as presently perceived.

BRIEF DESCRIPTION OF THE DRAWINGS

FIG. 4 illustrates a search results web page with classification structures responsive to a search query, according to certain exemplary embodiments.

DETAILED DESCRIPTION OF EXEMPLARY EMBODIMENTS

Overview

Figure 1:
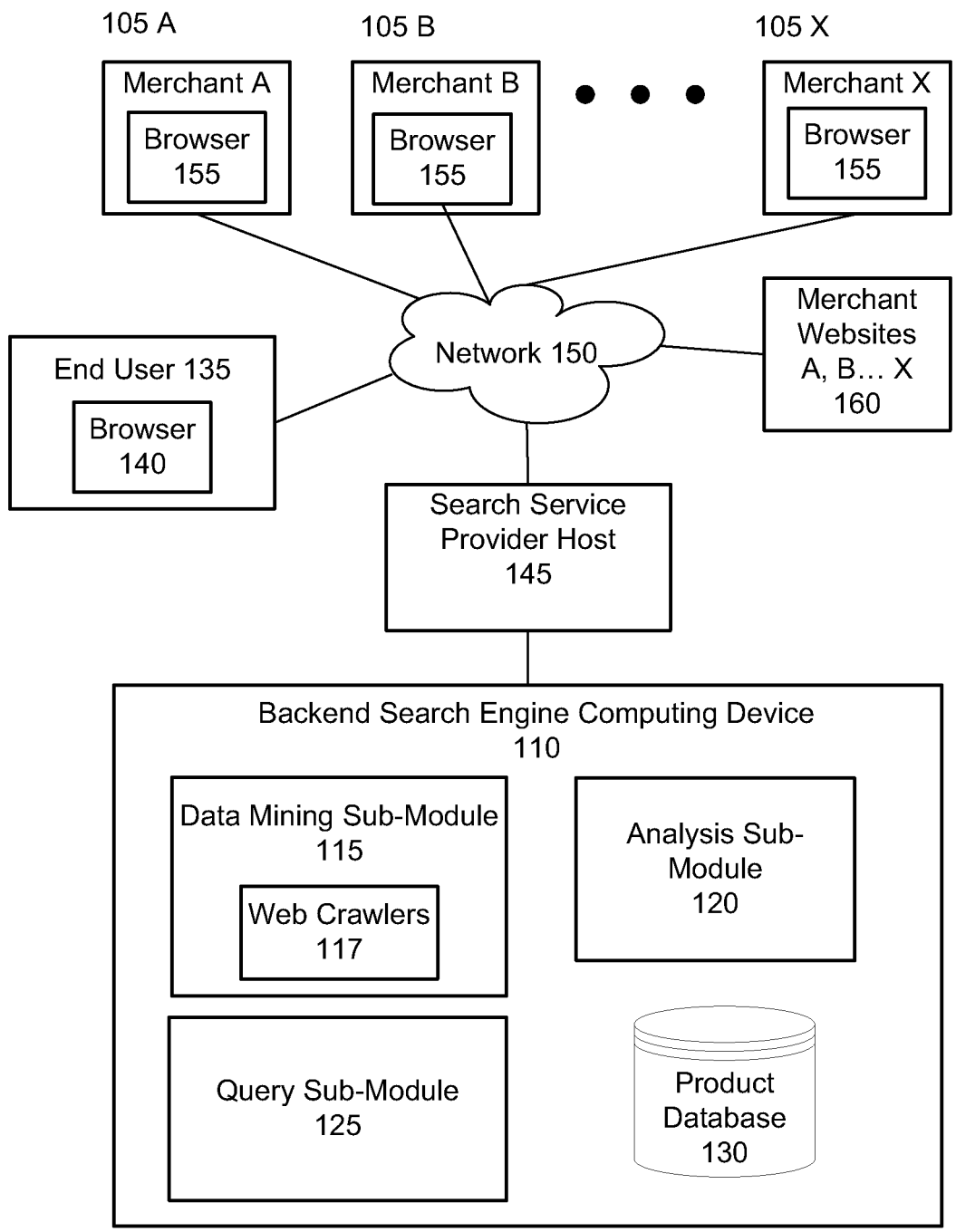
FIG. 1 is a block diagram depicting a system for automatic data mining for structures in product queries, according to certain exemplary embodiments.

The methods and systems described herein enable automatic data mining for internet-based product classification structures from multiple merchant websites. These methods and systems may include, in certain exemplary embodiments, a validity check for the classification structures, and storage of validated data and classification information for augmenting search results.

A search engine software application includes a front-end search engine application (e.g., a search website or a stand-alone internet based search application) as a user interface on a client computing device, a backend search engine application on a backend computing device for data processing, and a backend database resident in the backend computing device for storage and retrieval of product data. The backend search engine application receives search queries from the front-end search engine application. The received search queries are granulized (or parsed) by a computer-coded query sub-module of the backend search engine application into words and/or phrases. For purposes of simplicity in this disclosure, the term "components" is used herein to refer to either a word or phrase.

It is appreciated that search queries may be transmitted component-by-component, dynamically, from a front-end search engine application to a backend computing device at the time of input at the search engine application. The dynamic searching of components instantaneously can be considered as a method of performing the "granulizing" function on the front-end computing device using a dynamic scripting code rendered on the search engine application. The dynamic granulation function serves the same purpose as being granulized on the backend computing device, as the backend computing device is configured to support this dynamic processing.

The components of the search queries are analyzed for a match from stored historic key words. When a match is found, structural parameters relating to the matched key words are extracted and associated with the received components. An analysis sub-module of the backend computing device can generate a search results webpage, which includes a list of hyperlinked products, product images, and a brief description of each product. In certain exemplary embodiments, the list of hyperlinked products is responsive to the received search query and is sortable at the client computer. For example, the end user may sort the list by the extracted structural parameters and/or by popularity.

By way of an example, search query parameters such as "attribute" and "category," are retrieved by an analysis sub-module on the backend computing device, based on an exemplary search query "North Face Fleece Jacket." In this example, the "attribute" and "category" distinction provides a context based on a contextual similarity analysis of the components in the search query and the stored key words in a product database. Contextual similarity, and its variations, for the purposes of this disclosure is defined as the distance, angle, vector, or any measure of difference between two classified groups of semantically or non-semantically similar components in a vector (or multi-dimensional) space. The groups of semantically or non-semantically similar components are represented in vector space by unique coordinates in a multi-dimensional plane (e.g., x-axis, y-axis, and z-axis).

Once a match for the received key word is obtained from the product database, the match is further analyzed in the analysis sub-module for a contextual similarity fit relating to the structural parameters of the stored search query. This is implemented by verifying the extracted structural parameters to determine that each component is a right fit, contextually, to the other components in the received search query. The similarity analysis is implemented by a similarity software module in the analysis sub-module. In one embodiment, the contextual similarity for fitting of key words is implemented by a non-semantic matching method for each of the components. Exemplary methods for measuring similarity include such methods as Euclidean distance, vector modeling, or cosine angle distance method. When a contextual similarity fit is found, the analysis sub-module provides the query sub-module with a product results webpage that is transmitted from the backend computing device to the client computing device.

Further, the received search query components are analyzed by the analysis sub-module for semantic relationships with the stored key words to include all synonyms, and other semantically related word and/or phrase components. A contextual similarity validation check is implemented to ensure that structural parameters extracted from a matching stored key word is a valid parameter with respect to the received key words. For example, "North Face®" is a popular jacket brand and identifies as a "category" type search query parameter, however the components, "north" and "face", are matched independently first with key words. In the event of a match with non-brand classified key words, the validity process will be able to filter the unrelated matches from the search results. Thereafter, the components are combined to a phrase component and the search and validation process is repeated.

Before storing key words in the product database, component tags are implemented by the data mining sub-module as a mapping method to tag components of a search query with short software codes. This method creates a map that relates information, such as product hyperlinks and product description pages, to each of the components. Another exemplary tag is used to provide information on the structural parameters for each of the key words in a stored product database. Further, product URLs tagged in the tags of the matched stored key words are accumulated in a search results webpage as the list of hyperlinked products. The search results webpage with a list of hyperlinked products is transmitted by the search query sub-module to the end-user in response to the search query entered on the client computer. Further, the list of hyperlinked products is arranged (or classified) by the structural parameters identified from the search query, and can be sorted by the end-user in the front-end search engine application using the structural parameters.

By way of an example, the hyperlinked products list in the results webpage can be sorted by "category" or "attribute." Other exemplary tags attached to each component of the search query include hyperlinked webpages (product webpage URLs), hyperlinked product images, product information (e.g., product review, and brief description of the product), and merchant information (e.g., merchant review, and brief description of the merchant). Merchant and product information can alternatively include discount information from multiple merchants for the same product, product classification information, brand information, pricing options, and product lines (e.g., Sony® manufactures and sells televisions, cameras and many other lines of products), and manufacturer information (e.g., manufacturing location, etc.). Each type of information may be used interchangeably in this disclosure and will herein be referred to as "product information."

In certain exemplary embodiments, through the use of dynamic hypertext markup language ("DHTML") and/or JavaScript in the front-end search engine website, user interaction, such as, a click on a hyperlink, or a selection in a "selection box and/or area" will enable a listening function within a DHTML webpage to relay the selection information back to the backend search engine application as an automatic search query. The backend search engine application matches and validates the automatic search queries in the same manner as it processes the manual search queries. The backend product database includes product information in the form of key words, or words and phrases that are generated from textual content in the product information using a computer-coded analysis sub-module and a computer-coded data mining sub-module of the backend search engine application.

The data mining sub-module of the backend search engine application includes software code that initiates targeted and/or general aggregation of product data from websites on the internet. This product data can include product webpage and image URL, product information, merchant information, and manufacturer information, as disclosed above. The product data is used by the analysis sub-module and the query sub-module to build the product database using validated classifying structures. Further, the product data is processed by the analysis sub-module in the same way as a received search query.

In certain exemplary embodiments, this method involves granulizing the product data into components; matching the product data components with key words from the product database, or across components from multiple merchants of the similar products; verifying the matched product data components by contextual similarities to determine their structural parameters; creating new structural parameters if the existing structural parameters do not fit the product data components; and, finally, tagging each product information component with a component tag reflecting the relationships with other components, product webpage URL, structural parameters, etc. As an example, product data can be mined and stored in an index arrangement in the product database, where an index of the components of the product data and search queries include component tags to the new merchant, product, and manufacturer information. The product database will, therefore, include historical information gathered from previous product search queries and associated results in the component tags, as well as current real-time information gathered from live websites on the internet. The real-time information is obtained from product logs, URLs, and product description pages created and updated by merchants on their websites.

In certain exemplary embodiments, web-crawling software in the data mining sub-module combs through internet sources, such as, product catalogs, news releases, blogs, and social websites for new and/or updated product information. Other exemplary internet sources include product logs, product webpage URLs, and product description pages created and updated by merchants on their websites. It is also common for the product webpage URLs to include information relating to classification of a product by a merchant website. Such information may include, for example, the various sub-folders in an online website application directory, where each sub-folder describes a narrower classification of products. In an example, "http://www.merchantwebiste.com/apparel/jackets/fleece.html" is a URL of a product webpage or a product category. From this exemplary URL, classification information can be extracted that informs the search engine that a product within the "fleece.html" webpage is classified under category—"apparel," type—"jacket," attribute—"fleece." This information can be used for validation of both new and updated product data, both of which may be mined by the data mining sub-module. The information can also be validated first, using the key words in the product database, prior to being tagged and stored, according to certain exemplary embodiments.

In certain exemplary embodiments, validation is implemented by comparing the information from one internet source across the multiple internet sources to determine the authenticity of the information. In one example, when a certain pre-determined percentage of merchants classify products in a similar structure, the classification may be deemed valid. Merchant information can also be used for validation of new product data and search queries, by comparing information received from multiple merchants. In this case, the new product data can be granulized into components and a component tag can provide relationship information between historic search queries, historic merchant information, and multiple related webpages for each of the new product data components. The related webpages may be defined in the component tags as correlation percentages values between product webpages, as ranking information pertaining to the frequency of a search query, or as the amount of web-traffic on a product webpage. The component tags for the merchant information can be generated by the analysis sub-module of the backend search engine application, in certain exemplary embodiments. The analysis sub-module can perform data analysis on the raw data collected from multiple merchant websites using a crawling software in the data mining sub-module, as well as incorporating search queries received from the client computer via the query sub-module. The raw data and search queries can be granulized prior to being validated using validation software in the analysis sub-module, and stored in the product database as components with component tags for future product searches.

In certain exemplary embodiments, a candidate attribute can be determined to be a valid attribute if and only if there are many brands associated with the attribute-category pair, and the click distribution for brand-attribute-category queries is not skewed towards one brand. For example, the attribute "fleece" in the exemplary search query "North Face Fleece Jacket" can be determined to be a valid attribute only if there are many brands associated with the attribute-category pair fleece and jacket, and the click distribution for brand-attribute-category queries (e.g., "North Face Fleece Jacket") is not skewed towards one brand. Similarly, a candidate product line may be considered valid if and only if the click distribution for the phrase-product line-category query is skewed towards a single word or phrase, which is a brand. For example, if the word "momentum" in the context of "jackets" is associated with the phrase "North Face," momentum may be considered a product line of North Face brand jackets.

When the front-end search engine application is deployed as an independent online search service website capable of aggregating webpage information from the internet, then each of the URLs in a search result webpage can be hyperlinked to product webpages of the respective merchants selling a product that is requested by the search query. However, if the front-end search engine application is deployed within a merchant's existing website as a search section of the website, each of the merchant's product webpages can be hyperlinked in the search results webpage. Further the merchant's products can be classified according to the classification structure validated from the other product webpages on the internet. In conjunction with the analysis sub-module, the data mining sub-module generates a substantial amount of the product database data, and therefore, forms the database generation part of the systems and methods described herein.

In certain exemplary embodiments, the query sub-module of the backend search engine application performs various functions on the search queries received from the client computer. Such services can include, for example, receiving a search query from an end-user, granulizing the search query, and providing the end-user with a results webpage including responsive products in a sortable list or grid, where each product is hyperlinked to its respective product webpage. The list or grid can be sortable by the end-user according to the structural parameters identified from the search query. A matching software of the analysis sub-module receives the key words from the query sub-module and searches the product database for contextual similarities between the received key words and the stored key words.

The contextual similarities of search query components define the structural parameters of the search query components. The analysis sub-module validates the identified structural parameters for each search query component. The search query components are then matched to the product database of key words by the query sub-module, and a search results webpage including the matched hyperlinked products in sortable list format is presented back to the end-user of the client computing device.

In certain exemplary embodiments for creating new structural parameters, an automatic smart learning software can be used to teach the analysis sub-module to use a search query components as a new structural parameter in the event that the component does not fit into existing structural parameters. When a component of the search query is found to be associated with another component in multiple search queries, the two components are analyzed to determine a "fit" for a new structural parameter. By way of an example, if a received query component is unique, but is not a brand, a product, a store, or any pre-defined classification, then the component is analyzed to check if it is consistently found in a search query including other components (i.e., key words or new internet source content components). In the learning process, if the unique component appears to be linked to a product, for example, "boots," where the relationship is established by a component-tag, the unique component will be validated by measuring a significance of appearances of a similar relationship with the same components. Exemplary significance and fitting methods implemented includes such methods as, a line fitting or a least square fitting (LSF) method. In certain exemplary embodiments, a good contextual similarity fit is a measure of at least 50% similarity between the unique component and other components from web-crawling sources. Further, in the learning process, the unique component may be determined to be significantly related to a product component by a non-semantic relationship, but is not a brand component. This results in the learning to the smart learning algorithm that the unique component is an independent and new structural parameter. A classification for "type" of product is registered (or stored in a relational format—e.g., tables, maps, or tags) in the product database with the unique component to provide the unique component a new structural parameter classification. It can be appreciated that the unique component in itself forms the structural parameter. As an example, "steel toe boots" is a search query with strong non-semantical relationship between components "steel toe" and "boots." "Steel toe" is not a brand during the validation check, and does not fit existing "category" type structural parameters. By way of learning in the exemplary smart learning algorithm, "steel toe" will be registered as a new structural parameter, and therefore, a new classification, or a new classification structural parameter, "type," is defined, and "steel toe" is tagged with a component-tag associated with the "type" parameter. Further, unknown or new brand names can use this verification and validation method for proper classification prior to inclusion in the product database.

In certain exemplary embodiments of the validation process, "North Face Fleece Jacket" is entered as a search query by an end-user in the search engine on a client computer. The search query is received in the backend search engine application by the query sub-module, where it is granulated into component words and/or phrases. Each component of the search query is compared with historical and real-time search queries for validation. Comparison is initiated by the query sub-module from the component "jacket," where a pool of historical queries including the word "jacket" and all its relationships is generated by analyzing the component tags relating product webpage URLs in the product database. The component tags, in one example, provide a pool of computer-coded tags, where each tag corresponds to a webpage URL, image URL, and other product related information. Thereafter, "fleece" is added to the word "jacket" and the search is further narrowed to a phrase component including the two words. Each such iteration provides a validation step for the search query, thereby indicating that the words are indeed paired together, and that each word and/or phrase can be classified.

Since the components "North" and "Face" do not suitably classify within the "jacket" category, they are combined into a phrase type component, and compared for validity using different combinations of the two words. When a match is found, a classification is assigned based on the historical context of the components. In the case of the "North Face® Fleece Jacket," upon validation with historical queries, "Jacket" is classified as the category, "fleece" as the attribute, and "North Face®" as the brand. The attribute and/or category classification provides the context to the search query based on a similarity analysis of historic queries. This validation method can be applied to validate the new product information in textual content generated from web-crawlers prior to storing the new product information as textual components of the received textual content into the product database, as well as to validate new search queries received at the backend search engine application via a product search log or in real-time as the search is generated.

The validation method, as disclosed herein, removes inconsistencies between multiple merchants regarding how common products are classified. For example, an online merchant selling apparel can classify products as men's and women's apparel, shirts, shoes, accessories, winter wear, and summer wear, to name a few. The merchant classification is implemented to make the website interface customer friendly based on a function of what the merchant perceives as the online shopper's habits. However, different classification is removed by a search engine after validation checks, and a clean list of sortable products is made available by the aggregation methods disclosed herein. Further, a product may be listed with reasonable description to provide the customer with sufficient information prior to clicking on the hyperlink to visit the actual online merchant's webpage. It is also appreciated that electronic and industrial products are difficult to describe in the absence of complete technical specifications. Often, such technical specifications might be different or incorrect among different merchants. Technical specifications for products are also listed by the product manufacturers on their websites, even though many manufacturers do not sell the products directly. The methods and systems described herein can use web-crawling methods to obtain product data directly from manufacturers, which can then be used to validate product data from merchants prior to tagging and storage thereof in the product database.

In other exemplary embodiments of verifying search query or textual components classified in a structural parameter, once a search query has been classified in at least one structural parameter, an automated validation software can measure the web traffic for queries that include each component. If high web traffic exists in association with a particular key word and its classified structural parameter, then the component can be accepted as valid with respect to the structural parameter that it is classified within. In an example, suppose that, for verifying brand names in the "category" type structural parameters, a search query for "Nikon® binoculars" brings up a result that "Nikon®" is an unknown structural parameter, while "binoculars" is a known product structural parameter. An automated validation software component of the data mining sub-module measures internet traffic associated with the components "Nikon®" and "binoculars," and its associated product hyperlinks by measuring impressions and hyperlink clicks. A click is a manual or automatic execution of a hyperlink, which causes the underlying software code to re-direct a user to the address of a product webpage. Impressions are defined as the number of times a hyperlink is displayed for a particular search query. With each click, the automated validation software can keep track of user acceptance of key words. If an end-user does not select any of the hyperlinks in a search results webpage for a search query, then the results may be considered incorrect for the purposes of validation of the search query. Thereafter, the validation software can use this information to determine the validity of the Nikon® as a brand name, along with the validity of the binoculars product category within the Nikon® brand name. When a new end-user queries the phrase "Nikon® cameras," the validation software can analyze user clicks from various internet sources for the same components, where the second component (i.e., "cameras") is recognized as a product structural parameter. A high number of clicks can indicate that the search query is valid, and that the generated search results webpage lists items that are correct and responsive to the search query. This exemplary method validates the structural parameter in general, and the word component "Nikon®" as being an accurate brand name within the "category" type structural parameter. The automated validation software can store all the mined information, new parameters, and words into the product database for future search queries.

In another exemplary validation method, content mining (e.g., textual content) is implemented by a targeted web-crawler software developed to search internet sources for the phrase "is a" or "is an" with reference to an unidentified key word. An unidentified key word is a component that fails to find a match or a valid structural parameter from the product database. This allows the validation software to determine whether the unidentified word or phrase component is valid and belongs to a structural parameter, or is valid as a new structural parameter. By way of an example, the textual content mining software analyze product webpages, blogs, and other internet sources for a targeted statement, such as, "Nikon is a manufacturer . . . " or " . . . Amazon is an online store," where "Nikon" and "Amazon" are exemplary unidentified search queries. As a result of the content mining operation, "Nikon" can be identified as a "manufacturer" structural parameter. However, suppose the product database does not include an "online store" structural parameter, then "Amazon®" may not fit into existing structural parameters. As a result, the analyzing sub-module can create a new structural parameter called "online stores" and add the new structural parameter as a component tag to the "Amazon®" component in the product database. This exemplary validation method can be used in the for new products or old products with new brand names (that merchants create almost everyday).

In another exemplary validation method, verifying brand names within the category type structural parameter is implemented using n-grams or morphological methods. Internationally, brand names in different languages are best identified by morphological methods. N-grams are manufacturer defined tags, such as, navigational queries or meta-tags, which result in search queries being directed to the manufacturer's website. N-grams are adopted into the component tags of components in the product database, thereby providing a multiple validation method where the manufacturer assists in product and brand recognition. Web crawling software can be defined to capture meta-tags, product reviews, and language characters from various languages using character recognition.

In certain other exemplary embodiments for real-time validation of a search query, the search query from a client computer for "MP3 phones" generates a real-time results webpage from the query sub-module. The results webpage from the query sub-module on the backend computing device is responsive to the search query, and includes a list of phones with MP3 capability, where, for each list the webpage includes a hyperlink to a product webpage. An exemplary list item is a "Sony® Phone" with a hyperlink to the product webpage of the Sony® merchant selling the device. The search query can be first validated by checking if "MP3" and "phones" are indeed searched for together. Once validated, structural parameters can be extracted or created and a list of products matching the key words are generated. The result webpage can be created by arranging the list of products into a sortable list, which is sortable by the previously identified structural parameters. In certain exemplary embodiments, this results webpage is computer-coded in HTML with JavaScript for dynamic effects, and sent to the client computer for rendering. the search query, along with component-tag information can be used to update the product database for future searches.

In certain other exemplary embodiments of the systems and methods disclosed herein, when a user searches on a product search website for a "Chrysler® Phone," the search query can be compared against historic search queries to see if a common context exists with the other search queries. In this example, the key words cannot be validated as the components are not found together, i.e., Chrysler® does not make phones as of the time of the search query. Since the search query is incorrect, a real-time textual content mining process can be initiated using the unidentified search query embodiment previously disclosed, and the results can be provided to the analysis sub-module. If the search query is deemed incorrect and not unidentified, the analysis sub-module can provide the query sub-module with an appropriate message to be transmitted to the front-end computing device, listing the error and/or listing products which are separately related to each of the two unrelated components of the search query.

In certain other exemplary embodiments, several structural parameters can be associated with each word component. For example, a jacket can include a "brand name" as a component within the "category" type structural parameter or a feature (e.g., "woolen fabric") that forms an "attribute" type structural parameter. As another example, a "sale" function is available within the "category" type structural parameter to classify items marked on sale. Such items may be identified using component tags to index components with merchants that have the jacket or similar attributes and brand names items on sale. New structural parameters are created based on the results from web-mining methods as described above. If, during a validation check, the validation software identifies that certain components include the term "jacket," then the components are associated with multiple structural parameters where relevant to the feature of the jacket and brand name. Then the components can be tagged via component tags to each of the structural parameters that they are identified as being linked with. Further, a ranking option can be utilized to rank the component against multiple structural parameters. Other structural parameters that can be created include, "best," "cheap," "discount," "prices," "sale," "retailers," "brands," and their synonyms, for example. Further, the intelligent validation software can be capable of using synonyms of search queries to maximize product match results in the case of an unintentional error in the end-user input.

In yet certain other exemplary embodiments, the front-end search engine application, the backend search engine application, and the product database can be developed and/or maintained by an independent online search service for use by smaller merchants on their website. The front-end search engine application can be deployed into an existing merchant website using hypertext markup language (HTML), JavaScript, and/or Java, for example. Further, the search results feed from a backend product database can be provided via an extensible markup language (XML) script that allows a merchant to customize the results, including look-and-feel interface of the results to match the merchant's existing website design. The product database for validation can be created by aggregated information from multiple internet sources, while the product data for the search results webpage can be limited to the merchant's own products, thereby deploying a search engine component for existing products in a merchant's existing website. The product database can provide validation and classification structure to the search queries and the product results webage within the merchant's website, while using various external websites to develop the classification structures. Additionally, if the merchant has a relationship with other merchants, or with the independent online search service provider, the search results webpage generated by the backend search engine application can include external links to the external merchants' webpages, and to webpages recommended by the independent online search service provider. In certain exemplary embodiments, a pay-per-click relationship can provide the merchant hosting the external links with revenue streams based on the referrals provided to the external webpages.

System Architecture

FIG. 1 is a block diagram depicting a system 100 for automatic data mining for structures in product queries, in accordance with certain exemplary embodiments. Multiple merchants 105 use computing devices to present website information and product information to physical backend computing devices, such as an end-user device 135, through at least one network 150. Each network 150 includes a wired or wireless telecommunication means by which computing devices (including devices 105 and 135) can exchange data. For example, each network 150 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer-based environment. Each computing device (including devices 105 and 135) includes a device capable of transmitting and receiving data over the network 150. For example, each computing device can include a server, desktop computer, laptop computer, smartphone, handheld computer, personal digital assistant (PDA), or any other wired or wireless, processor-driven device.

A search service provider hosts a service provider website 145, which merchants can access via the merchant's computer 105 using a web-browser 155. Alternatively, the search service provider can provide merchants with a downloadable stand-alone internet-based application that can be accessed outside of a web-browser. In certain exemplary embodiments, the search service provider website or host 145 requests the merchant to provide information regarding the products that the merchant website sells. This provision of information may involve a login procedure via the search service provider website or host 145. A backend search engine computing device 110 analyzes the provided information via one or more software modules, such as a data mining sub-module 115, an analysis sub-module 120, and a query sub-module 125. These software modules can be designed to perform various tasks in connection with search queries, as described below. Each of the modules can exist on different physical backend computing devices, which may be designed for the same or different network tasks. In certain exemplary embodiments, a multi-tier architecture can be implemented, incorporating a database tier for a product database 130; application tiers for the query sub-module 125 and the analysis sub-module 120; and a web-tier for the data mining sub-module 115. In certain exemplary embodiments, the backend computing device 110 includes the product database 130.

The data analysis sub-module 120 incorporates various functional software programs for performing mining and analysis of raw data from the internet and/or regulated data from the product database 130. Exemplary software programs can include a validation software, a matching software, a similarity software, a smart-learning software, and/or a fitting software. It is appreciated that each of these software programs can be ported to other sub-modules or other network tiers and do not have to physically reside with the analysis sub-module 120.

The data-mining sub-module 115 generates software web-crawlers 117 based on instructions from the analysis sub-module 120, or independently, based on a set schedule. Each web-crawler 117 crawls one or more merchant websites 160, which may be hosted remotely by a hosting service or inhouse by each individual merchant, and can be created and/or updated by each merchant using their computing devices 105. If a merchant is not associated with the search service provider 145, then no product information may exist for manual provision to the search service provider 145. The web-crawler software 117 can independently monitor each merchant's website, irrespective of the merchant's relationship with the search service provider 145. The web-crawler 117 can analyze the webpages to identify general information and/or targeted information according to its design settings. In certain exemplary embodiments, the web-crawler 117 implements hash comparisons to identify new product data. Hash comparison is a method of indexing old website page files and comparing with newly index website page files to identify differences. In certain other exemplary embodiments, the targeted web-crawler 117 is designed to search for certain products, brand names, structures, or phrases.

A general web-crawler 117 targets entire webpages to identify any new information including new product data, which is then passed to the analysis sub-module 120 for more detailed analysis. The query sub-module 125 receives search queries from the end-user 135, granulizes the search queries, and provides responses in the form of a search results webpage to the end-user 135. In certain exemplary embodiments, the end-user 135 provides search queries to the back-end search engine computing device 110 through the search service provider host 145 using a merchant website 160 on the end-user browser 140, or an internet-based stand-alone application on the end-user computing device 135. Alternatively, the end-user can access an independent front-end search engine website on browser 140, where the front-end search engine website belongs to the search service provider 145. The front-end search engine website is an aggregating search engine that aggregates product information from multiple merchant websites, and provides hyperlinked product results in a results webpage to the end-user, where the product results are responsive to an end-user search query.

System Process

Figure 2:
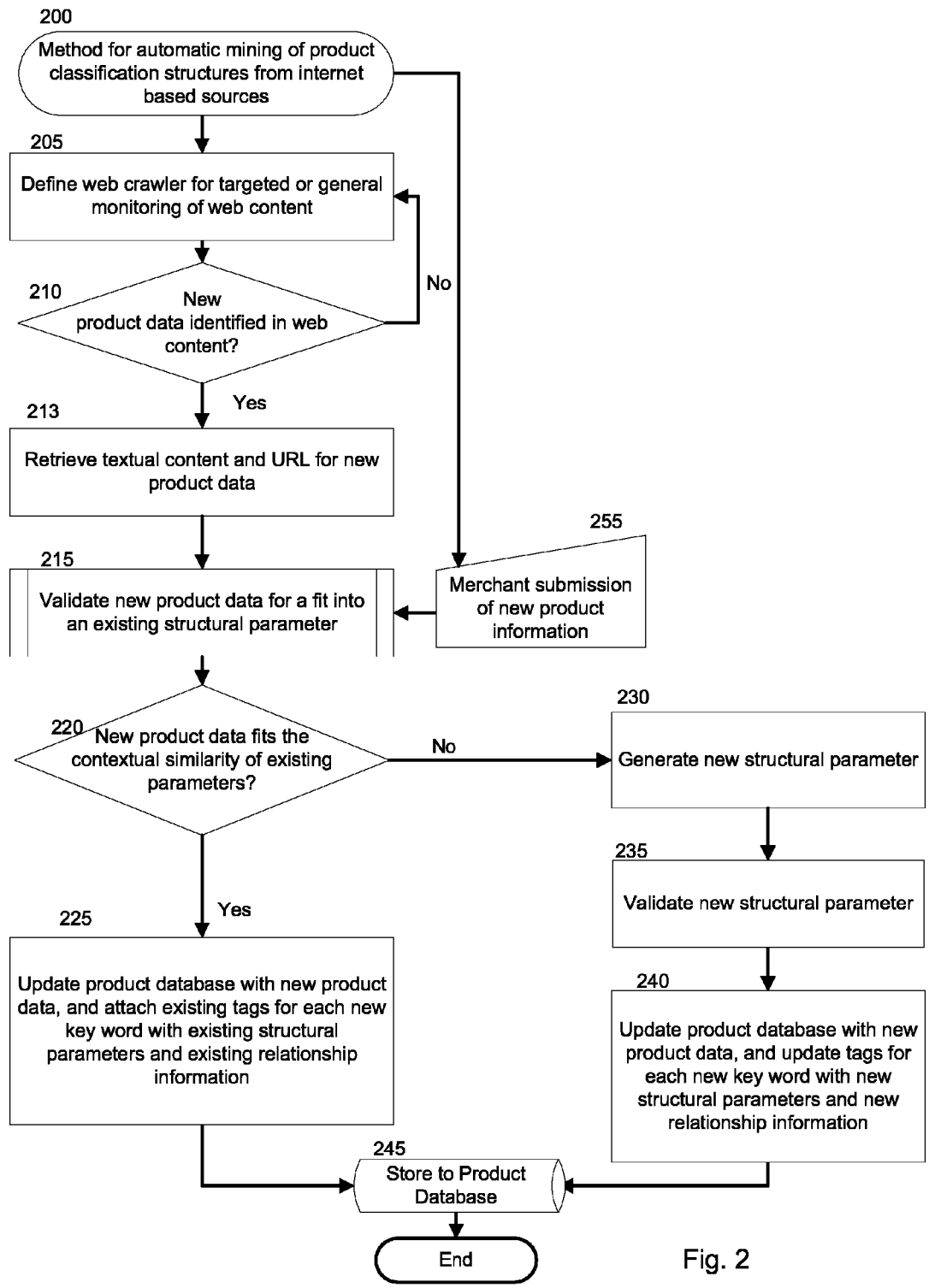
FIG. 2 is a flow chart depicting a method for automatic mining of product classification structures in product queries from internet based sources, according to certain exemplary embodiments.

FIG. 2 is a flowchart depicting a method 200 for automatic mining of product classification structures in product queries from internet based sources, in accordance with certain exemplary embodiments. With reference to FIGS. 1 and 2, the method 200 is controlled by the search service provider 145, and is initiated in block 205 by defining web-crawling software 117 for targeted or general web-crawling purposes. Alternatively, manual input of product information by merchants in block 220 can be implemented to make the search engine more robust. Further, the data mining sub-module 115 can also initiate the definition of a web-crawler 117 based on a request from the analysis sub-module 120.

When the data mining sub-module 115 determines in block 210 that new information in the form of textual content, such as new product information or updated product webpages exists in a particular website, the data mining sub-module 115 retrieves the textual content of the webpage and its URL and passes the retrieved information to the analysis sub-module 120 in block 213. Block 210 also retrieves textual components for analysis from the received textual content. In an exemplary embodiment, block 210 typically retrieves the received textual components from the textual content, where the received textual component is retrieved by analyzing relevance (or significance) of the textual component using such processes in block 210 as identifying nouns (indicating brands, manufacturers, or products), positive and negative language terms (indicating reviews), pronouns, and other grammatically significant text from the textual content.

Alternatively, in certain exemplary embodiments, the data mining sub-module may retrieve product search logs, sitemaps for a website, or product queries entered at the search engine. The analysis sub-module 120 analyzes the product information in the textual components to identify matches for the product information with existing or new key words, via block 215. The new key words in block 215 are typically retrieved at the same time as the textual content is retrieved, where the new key words include product information from other relevant websites related to the targeted product website, and the textual content is retrieved from a targeted web crawling process of a targeted website via the verifying process implemented by block 235. Block 235 instructs block 205 to perform the targeting crawling for the textual components that do not match existing key words. Targeted web crawling is typically applicable for verification of the new key words and identifying of new structural parameters associated with the new key words from website sources related to the target website source. By way of an example, a company may introduce a new product on a website or a new brand name for a new version of an existing product, where this new textual content is identified via block 215 using the company website, but needs verification from multiple sources, such as review websites and blog website prior to augmenting the search engine product database 130. Accordingly, the multiple website sources may provide new structural parameters assigned to the same new key words identified via block 215.

In certain exemplary embodiments, the analysis sub-module 120 may alternatively granulize the new product information from the textual content into key words and issue tags that include the URL for the webpage from which the key words came. The actual URL information may be substituted by a short URL code, which is related to a URL map including mapping information of URLs and short URL code. The analysis sub-module 120 analyzes and validates the granulized information using one or more validation software methods, as described in the above examples. Analysis may be initiated by comparing each component from the crawled webpage to stored key words in the product database 130. When the webpage components match key words, the analysis sub-module 120 may initiate a validation process according to a similarity context established by the structural parameter of the key word, as described in the above examples.

In block 215, the analysis sub-module 120 determines whether the textual components of the received textual content fits via contextual similarity to the existing structural parameters. Contextual similarity represents a semantic and non-semantic content fit for textual components, thereby not relying on components independent of the context provided by the textual content from where the textual components are extracted. Block 225 performs a verification to identify structural parameters associated with existing search query parameters that match the received textual component. In certain exemplary embodiments, if there is a positive match for the received textual component and an existing key word, additional verification is performed by running targeted web crawling and using a pre-determined contextual phrase to relate the received and matched textual component with the structural parameter of the existing structural parameter.

By way of an example, if a "Product A®" matches an existing key word, "Product A®", in the product database, and the existing key word includes a structural parameter identifying "Product A®" as a brand name, then a verification is done using a "is-a" as a pre-determined contextual phrase by targeting websites where the textual content includes such statements as, "Product A® is a . . . .". The textual content may include product description stating that "Product A® is a brand name for a . . . ", thereby providing verification of the received textual component and its newly assigned structural parameter from the existing key word.

To match the similarity context of the components, each component is considered along with other components in the webpage including the product information, in a non-semantic method, as well as a semantic method. In another aspect of the validation process, if the key word is one type of a semantic replica of the webpage component, e.g., same word, then the webpage component is not stored, but the component-tag of the key word that is an exact replica is updated to include a relationship to the new URL.

The validation methods described herein are based on a context, and some semantic and non-semantic methods, but are not entirely driven by matching of word or phrases. The new product information that can be tracked by the web-crawler includes product reviews, brand information, change in product URLs, and other related product information. The validation software matches certain components of the product webpage, such as brand names, product types, product webpage URL, assertive terms, offensive terms, with key words. The validation software does not match trivial word components that only support the critical word and/or phrase components, but do not provide an actual context. Product reviews can be analyzed using word analysis of paragraphs and textual objects from the webpage components. Offensive terms affect a products scoring in a product review section of the results webpage. Further, the validation software compares new or updated product information from multiple internet sources including blogs, manufacturer websites, news articles, and news feeds.

If the analysis sub-module 120 determines in block 225 that the new product information in the form of the received textual component does not fit the contextual similarity of existing structural parameters as a result of no matching existing search query parameters, then the analysis sub-module 120 generates a new structural parameter in block 230 by performing a targeted verification step via block 235 using the unmatched received textual component. The new structural parameter can be derived from the related webpage textual contents or from new targeted web crawling. Since the new structural parameter is a structural classification, it can also be a word or phrase component from the webpage content.

By way of an example, using one or more embodiments disclosed above, if an existing brand name manufacturer releases a new product, such as a cell phone, where the manufacturer never previously had a cell phone in its product line, then "cell phone" is a phrase component that will be validated for a similarity context with an existing key word including the brand name. The product release information is mined from the manufacturer webpage using the web-crawling software. Since a cell phone has never previously been sold by the manufacturer, the component "cell phone" will fail the validation test against the particular brand name. However, on comparing with multiple sources, since the new product will be covered by blog articles, news articles, and product reviews, it is possible to validate the new product as a valid product in the context of the particular manufacturer. Further, if the component is unique, i.e., no structural parameter exists for the component "cell phone," then a new one is created with the same name as the component in block 235. If another manufacturer introduces a cell phone, the validity analysis can involve checking only for the validity of the new manufacturer and its cell phone product.

In block 240, the analysis sub-module 120 updates the product database based on the verification in block 235. For example, continuing the "cell phone" example from above, the new manufacturer can be tagged to the existing "cell phone" structural parameter in block 240. The structural parameters, existing or new, are associated with the received textual component via block 240 and the textual component with its structural parameter tag is stored in the product database, block 245. Accordingly, the textual component becomes an existing key word for the next batch of textual content, with its associated structural parameter translating to the existing structural parameter. The analysis sub-module 120 updates the product database with the new component tags, new components, and new structural parameters, depending on what type of new product information is found. These updates are stored in the product database via block 245. The method 200 concludes via block 250 for a single textual content after all its textual components have been identified and stored.

Figure 3:
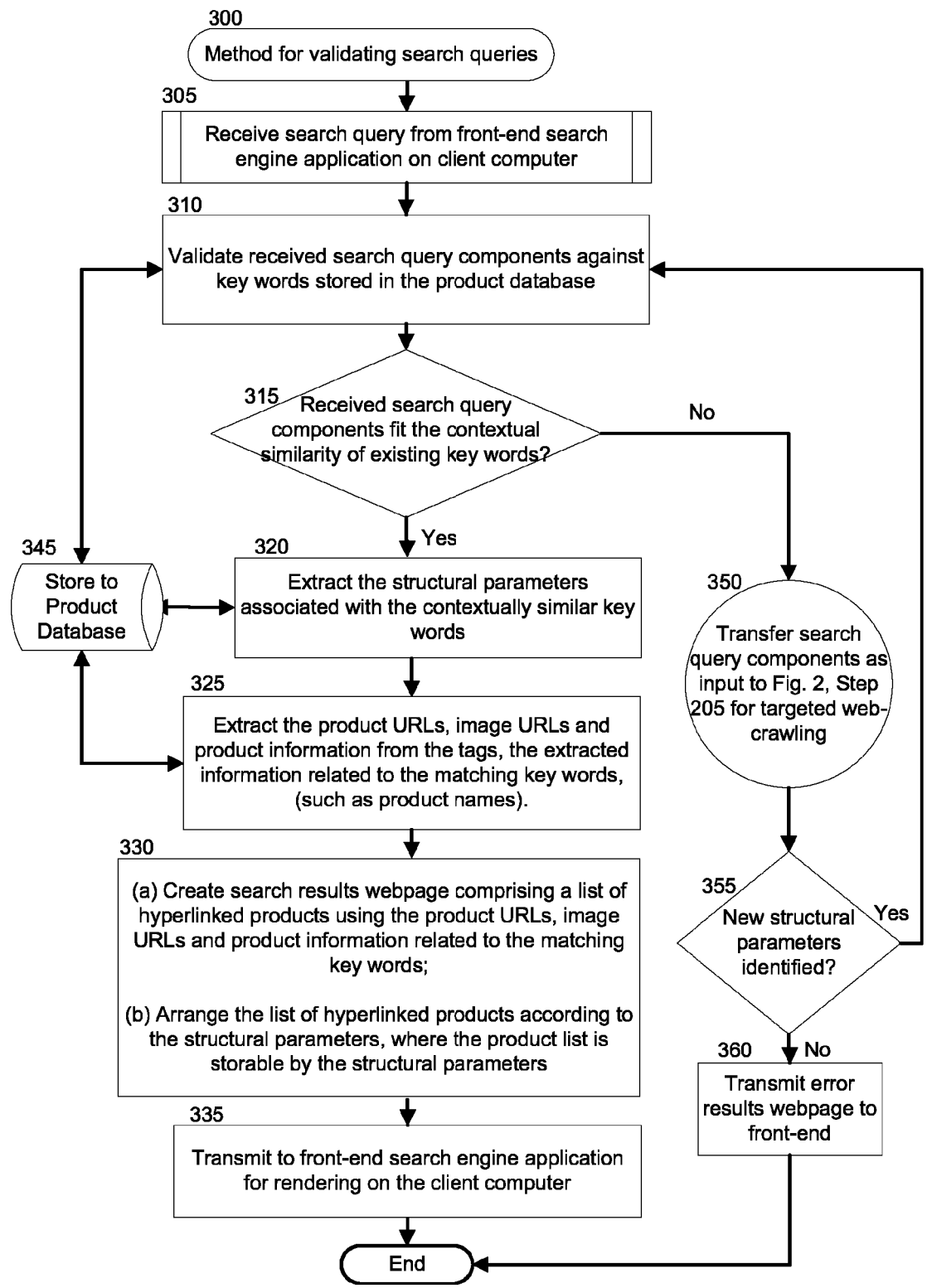
FIG. 3 is a flow chart depicting a method for automatic mining of product classification structures in product queries, verifying search queries, and providing search results with classification structures responsive to the search queries, according to certain exemplary embodiments.

FIG. 3 is a flowchart depicting a method 300 for automatic mining of product classification structures in product queries, verifying search queries, and providing search results with classification structures responsive to the search queries, according to certain exemplary embodiments. With reference to FIGS. 1 and 3, an end-user on a front-end search engine application sends a search query using a manual input, or automatically, by making a selection or a computer mouse-click on a certain portion of a merchant webpage, in block 305. Alternatively, if the end-user is using a search service website from the search service provider 145, then a similar manual input or automatic selection will trigger a search query to the backend search engine application in block 305.

The search query is received at the query sub-module 125 of the backend search engine application 110. The search query is transmitted to the analysis sub-module 120, where a validation software of the analysis sub-module 120 granulizes the search query into components in block 310, substantially as described above in connection with FIG. 2. The analysis sub-module 120 validates the components (both separately and in combination with one another) to identify a fit with existing key words in the product database 130, and therefore, with existing structural parameters. If the analysis sub-module 120 determines in block 315 that the components fit with the contextual similarity of existing structural parameters, the analysis sub-module 120 extracts the matching existing structural parameters from the component-tag of the matching key word in block 320. The analysis sub-module 120 further extracts the product URL information, image URL, and product information from the component tags of the matching components in block 325.

In block 330, the analysis sub-module 120 creates a search results webpage using the matched components from the product database 130, where the matched components are product names with the extracted product URL information providing a hyperlink for the product names. The product names are arranged in a classification structure according to the structural parameters associated with the product names. This classification structure is obtained from the component-tag of the matching components.

If the analysis sub-module 120 determines in block 315 that the received key words present no similarity context match with the existing structural parameters, then new structural parameters are generated using a targeted web-crawling method for validation of the search query in block 350. This process follows the flowchart illustrated in FIG. 2, starting at block 205. When the process in the flowchart of FIG. 2 is completed, the new structural parameters identified by the web-crawler and the validation process of FIG. 2 are used to validate the key words in block 355. In the case that no structural parameters can be found in block 360 for the key words from the end-user, an error search results webpage is generated and sent to the end-user in block 360. Alternatively, if two key words are not validated together, then they can be treated as separate search queries, and a search results webpage including hyperlinked products for the two components can be sent to the end-user. Further, an alternative search query can be suggested to the end-user by semantic methods disclosed above. The alternative search query can be generated using the context similarity software to generate a valid component from the product database as a replacement for an erroneous search query. An erroneous search query includes spelling mistakes, and incorrect product-manufacturer association, e.g., the search query, "Chrysler® Phone."

FIG. 4 illustrates a search results web page 400 with classification structures 415 responsive to a search query 405, according to certain exemplary embodiments. In the exemplary embodiment, a user has entered the search query 405 for information regarding "hiking boots." The backend search engine has generated search results 410 and 413, which are responsive to the search query 405. Results 410 include sponsored advertisements for products that are related to the search query 405. Results 413 include a ranked list of the most popular products that are relevant to the search query 405. For example, the results 413 may be generated based on the number of times each listed product is searched in a query, the number of sales recorded for each product, the number of clicks recorded for each product, etc. In certain exemplary embodiments, the end user may initiate a purchase for a listed product by activating a hyperlink 417 associated with the product.

The backend search engine also has generated classification structures 415 for the search query 405, in accordance with the methods described above. The classification structures 415 highlight an inherent structure in the search query 405. In particular, the classification structures 415 identify categories related to the search query 405, which may be desirable to the end user. For example, the end user searching for information regarding the product category of hiking boots may desire to obtain information regarding known brands (Vasque, Columbia, Asoto, North Face, and Merrell) of hiking boots. Similarly, the end user may desire to obtain information regarding stores known to sell hiking boots, different types of hiking boots, and different specific hiking boot products. A person of ordinary skill in the art will recognize that these classification structures 415 are exemplary and additional or alternative structures may be included in alternative exemplary embodiments. In certain exemplary embodiments, each item in each classification structure 415 comprises a search query suggestion, which includes a hyperlink, which the end user may activate to complete a search for additional information regarding the item. For example, the user may activate the hyperlink 420 to obtain additional information regarding the Merrell brand. For example, activation of the hyperlink 420 may initiate a new search query for the word "Merrell" either alone or in combination with the words "hiking boots."

General

The exemplary methods and systems described in this disclosure are illustrative, and, in alternative embodiments, certain steps can be performed in a different order, in parallel with one another, omitted entirely, and/or combined between different exemplary embodiments, and/or certain additional acts can be performed, without departing from the scope and spirit of this disclosure. Accordingly, such alternative embodiments are included in the inventions described herein.

The exemplary embodiments can be used with computer hardware and software that perform the methods and processing functions described above. As will be appreciated by those having ordinary skill in that art, the systems, methods, and procedures described herein can be embodied in at least one programmable computer, computer executable software, and/or digital circuitry. The software can be stored on computer readable media. For example, "computer-coded," "software," "scripts," and "programs" are software codes used interchangeably for the purposes of simplicity in this disclosure. Further, "memory" and storage can include such media as, floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for classifying search results responsive to a search query, comprising the steps of:
    maintaining, by a computer, a product database that associates each of a plurality of key words with a respective one or more structural parameters, each structural parameter comprising one of a product type, a brand name, a manufacturer, a product attribute, a product retailer, a product line, and a product discount;
    receiving, by the computer, a search query;
    identifying, by the computer, a match between one of a plurality of key words and at least a portion of the search query;
    in response to determining that at least one of the key words matches at least a portion of the search query,
        associating, by the computer, each structural parameter of each matching key word with the matching portion of the search query;
        verifying, by the computer, a contextual similarity between the matching portion of the search query and the structural parameter associated with the identified key words, the contextual similarity verification comprising parsing web content using a pre-determined contextual phrase, the contextual phrase comprising the structural parameter associated with each matching key word;
    in response to determining the contextual similarity between the one or more matching key words and the identified structural parameter,
        extracting, by the computer, product names associated with the matching key words in the product database and associated product URL information; and
        displaying, by the computer, a search result comprising the extracted product names and product URL information arranged by the identified structural parameters.

2. The method of claim 1, wherein the step of maintaining the product database comprises the step of obtaining the key words from at least one of product search feeds for known products, web clicks on search query results, product queries in product logs, website site-maps, product categories on manufacturer websites, and product categories in manufacturer brochures.

3. The method of claim 1, wherein at least a portion of the key words are generated based on search queries.

4. The method of claim 1, further comprising updating the product database based on the determining step by adding a new key word, which is based on the at least a portion of the search query, to the product database in response to determining that none of the key words match the search query.

5. A computer-implemented method for classifying search results responsive to a search query, comprising the steps of:
receiving, by a computer, a search query;
identifying, by the computer, at least one of a plurality of key words that matches at least a portion of the search query, each matched key word having associated therewith at least one structural parameter;
associating, by the computer, each structural parameter of each matching key word with the matching portion of the search query;
verifying, by the computer, a contextual similarity between the matching portion of the search query and the structural parameter associated with the identified key words, the contextual similarity verification comprising parsing web content using a pre-determined contextual phrase, the contextual phrase comprising the structural parameter associated with the matching key word; and
generating, by the computer, a search results webpage comprising search suggestions that are responsive to the search query and grouped by the structural parameters.

6. The method of claim 5, wherein one of the structural parameters comprises a brand name category.

7. The method of claim 5, wherein one of the structural parameters comprises a product attribute category.

8. The method of claim 5, wherein one of the structural parameters comprises a product retailer category.

9. The method of claim 5, wherein one of the structural parameters comprises a product category.

10. The method of claim 5, wherein one of the structural parameters comprises a product line category.

11. The method of claim 5, wherein one of the structural parameters comprises a product discount category.

12. The method of claim 5, wherein the matching portion of the search query comprises information regarding a type of product, and
wherein the search results webpage further comprises a list of items corresponding to the type of product, the list being arranged by popularity of the items.

13. The method of claim 5, wherein the matching portion of the search query comprises at least one of a word component and a phrase component,
wherein the phrase component comprises a combination of at least two words.

14. The method of claim 5, wherein the step of associating each structural parameter with the matching portion of the search query is automatically implemented by a computer-coded automated learning software.

15. The method of claim 5, wherein the identifying step comprises the step of evaluating a semantic comparison between the key words and at least a portion of the search query.

16. The method of claim 5, further comprising the step of obtaining the plurality of existing key words from at least one of product search feeds, web clicks on search query results, product queries logged in product logs, website site-maps, product categories on manufacturer websites, and product categories in manufacturer brochures.

17. The method of claim 5, wherein the existing key words comprise a product brand name, and
wherein the identifying step further comprises the step of identifying a match between the product brand name and the at least a portion of the search query only if the computer verifies the match based on a number of clicks recorded in a product search log for the product brand name.

18. The method of claim 5, wherein the contextual phrase comprises the structural parameter associated with the identified key words.

19. The method of claim 5, wherein the web content comprises at least one of a social networking website, a blog, a forum website, a product website, and a review website.

20. A computer-implemented method for mining classification structures for search results from textual content, comprising the steps of:
receiving, by a computer, textual content;
identifying, by the computer, a match between one of a plurality of key words and at least a portion of the received textual content, the matching key word having associated therewith at least one structural parameter that classifies the key word;
verifying a contextual similarity between the match and the structural parameter associated with each matching key word, the contextual similarity verification comprising parsing web content using a contextual phrase, the contextual phrase comprising the structural parameter associated with each matching key word;
in response to verifying the match, classifying, by the computer, the at least a portion of the received textual content with the structural parameter associated with the matching key word; and
storing, by the computer, in a product database, the at least a portion of the received textual content with its associated structural parameter.

21. The method of claim 20, wherein the classifying step is automatically implemented by a computer-coded automated learning software.

22. The method of claim 20, wherein the identifying step comprises the step of evaluating a semantic comparison between the plurality of existing key words and the at least a portion of the received textual content.

23. The method of claim 20, wherein the plurality of existing key words are retrieved from at least one of product search feeds, web clicks on search query results, product queries logged in product logs, website site-maps, product categories on manufacturer websites, and product categories in manufacturer brochures.

24. The method of claim 20, wherein the contextual phrase comprises the structural parameter associated with each matching key word.

25. The method of claim 20, wherein the web content comprises at least one of a social networking website, a blog, a forum website, a product website, and a review website.

26. The method of claim 20, wherein the pre-determined contextual phrase defines the at least a portion of the received textual content as being at least one of a brand name, a manufacturer, a retailer name, a store name, a place name, and a color.

27. The method of claim 20, further comprising:
receiving, by the computer, a search query;
determining, by the computer, whether at least one of the key words in the product database matches at least a portion of the search query, each key word having one or more structural parameters associated therewith;

in response to determining that at least one of the key words matches at least a portion of the search query, verifying, by the computer, a contextual similarity between the matching portion of the search query and the identified structural parameter, the contextual similarity verification comprising parsing web content using a pre-determined contextual phrase; and updating, by the computer, the product database based on the verifiying step.

28. The method of claim 27, wherein the step of updating the product database based on the determining step comprises the step of increasing a confidence score of an association between each matched key word and the at least a portion of the search query in response to determining that at least one of the key words matches at least a portion of the search query.

* * * * *